(12) United States Patent
Mueller et al.

(10) Patent No.: US 8,821,334 B2
(45) Date of Patent: *Sep. 2, 2014

(54) HIGH EFFICIENCY TRANSFER CASE

(71) Applicants: Joseph G. Mueller, Clarkston, MI (US); Douglas O. Bradley, Sterling Heights, MI (US); Bradley R. Larkin, Shelby Township, MI (US)

(72) Inventors: Joseph G. Mueller, Clarkston, MI (US); Douglas O. Bradley, Sterling Heights, MI (US); Bradley R. Larkin, Shelby Township, MI (US)

(73) Assignee: Magna International, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,584

(22) Filed: Mar. 26, 2013

(65) Prior Publication Data

US 2013/0303328 A1 Nov. 14, 2013

Related U.S. Application Data

(63) Continuation of application No. PCT/US2011/052562, filed on Sep. 21, 2011.

(60) Provisional application No. 61/386,805, filed on Sep. 27, 2010.

(51) Int. Cl.
*F16H 37/08* (2006.01)
*B60K 23/08* (2006.01)
*B60K 17/35* (2006.01)
*F16H 63/18* (2006.01)
*F16H 61/28* (2006.01)

(52) U.S. Cl.
CPC ................ *B60K 23/08* (2013.01); *F16H 63/18* (2013.01); *B60K 17/35* (2013.01); *F16H 2061/2869* (2013.01); *B60K 23/0808* (2013.01)
USPC .......................................... 475/198; 475/332

(58) Field of Classification Search
USPC .......... 475/198, 206, 210, 211, 295, 296, 332
See application file for complete search history.

(56) References Cited

U.S. PATENT DOCUMENTS

| | | | | |
|---|---|---|---|---|
| 5,330,030 A * | 7/1994 | Eastman et al. | ............... | 180/233 |
| 5,407,024 A * | 4/1995 | Watson et al. | ............... | 180/248 |
| 5,499,951 A * | 3/1996 | Showalter | ...................... | 475/204 |
| 5,584,776 A * | 12/1996 | Weilant et al. | ................ | 475/213 |
| 8,267,833 B2 * | 9/2012 | Mueller et al. | ................ | 475/302 |
| 2006/0128515 A1* | 6/2006 | Mueller et al. | ................ | 475/210 |

* cited by examiner

*Primary Examiner* — Justin Holmes
(74) *Attorney, Agent, or Firm* — Dickinson Wright PLLC

(57) ABSTRACT

A multi-speed power transmission device includes an input shaft, first and second output shafts and a planetary gearset. An axially moveable sleeve fixes the first output shaft and the input shaft for rotation when in a first position and the sleeve fixes the sun gear and the input shaft for rotation when in a second position. A hub is axially moveable and free to rotate relative to the first output shaft when in the first position. The hub is fixed for rotation with the first output shaft when in the second position. A cam plate is continuously fixed for rotation with the carrier and urges the hub toward its second position when in a second axial position. The input shaft drives the first output shaft at a reduced speed via the planetary gearset when the sleeve, hub and cam plate are at their second positions.

29 Claims, 10 Drawing Sheets

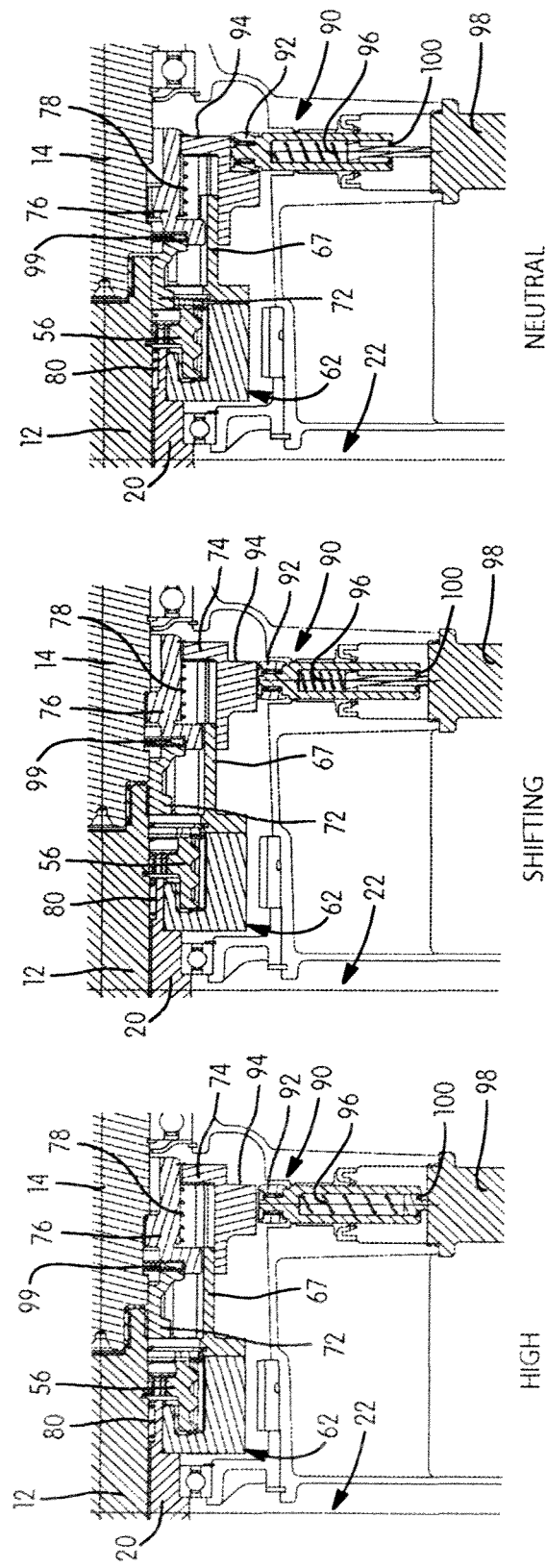

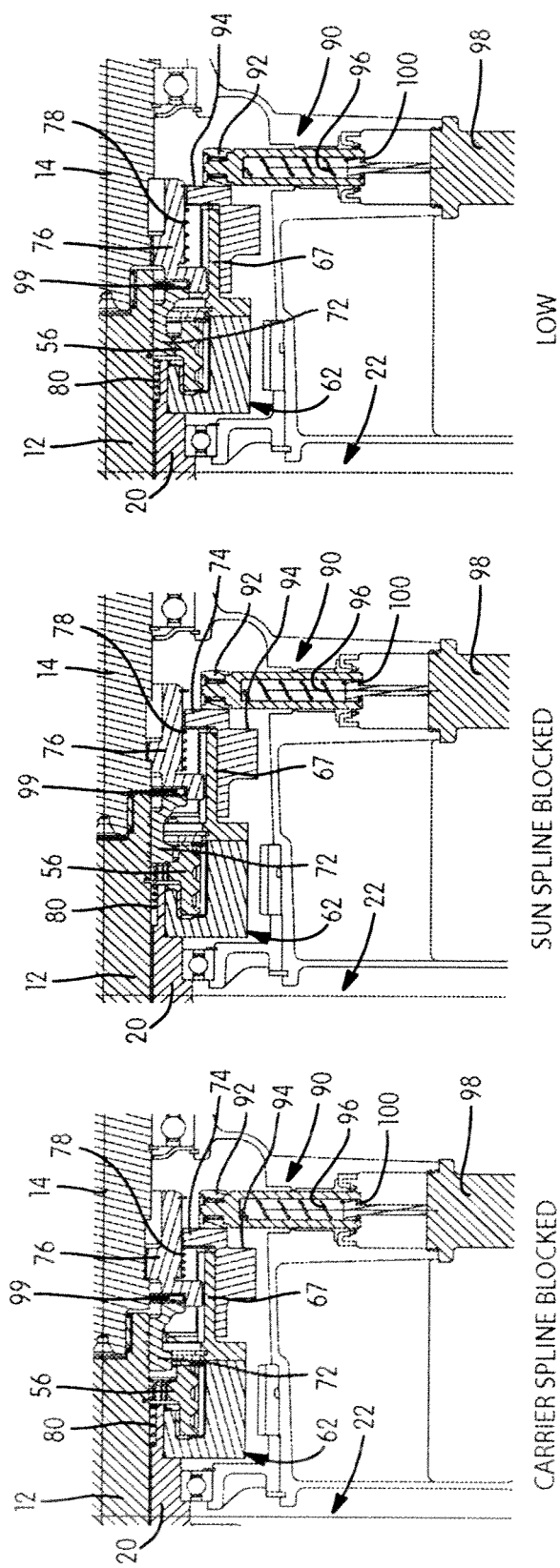

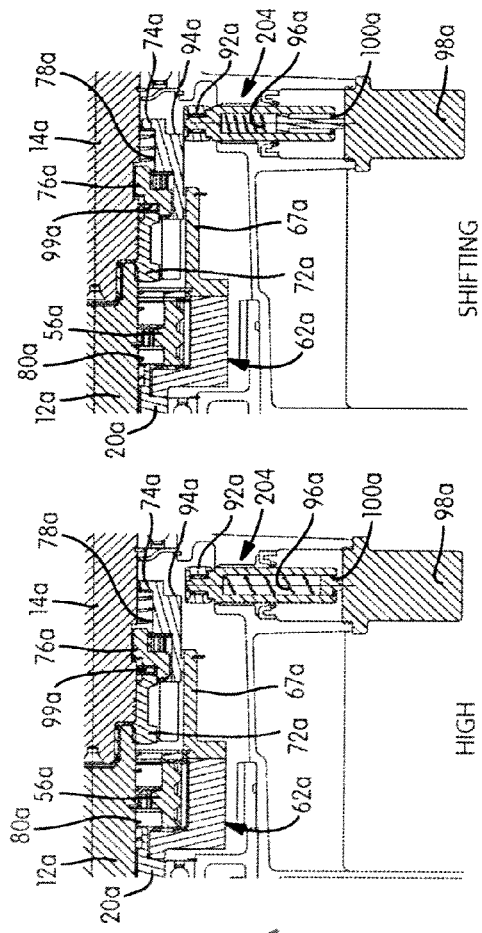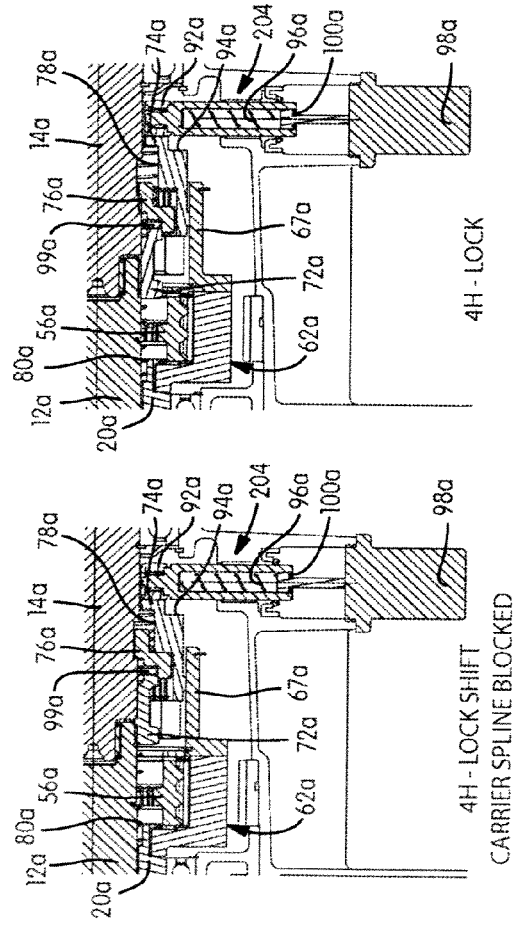

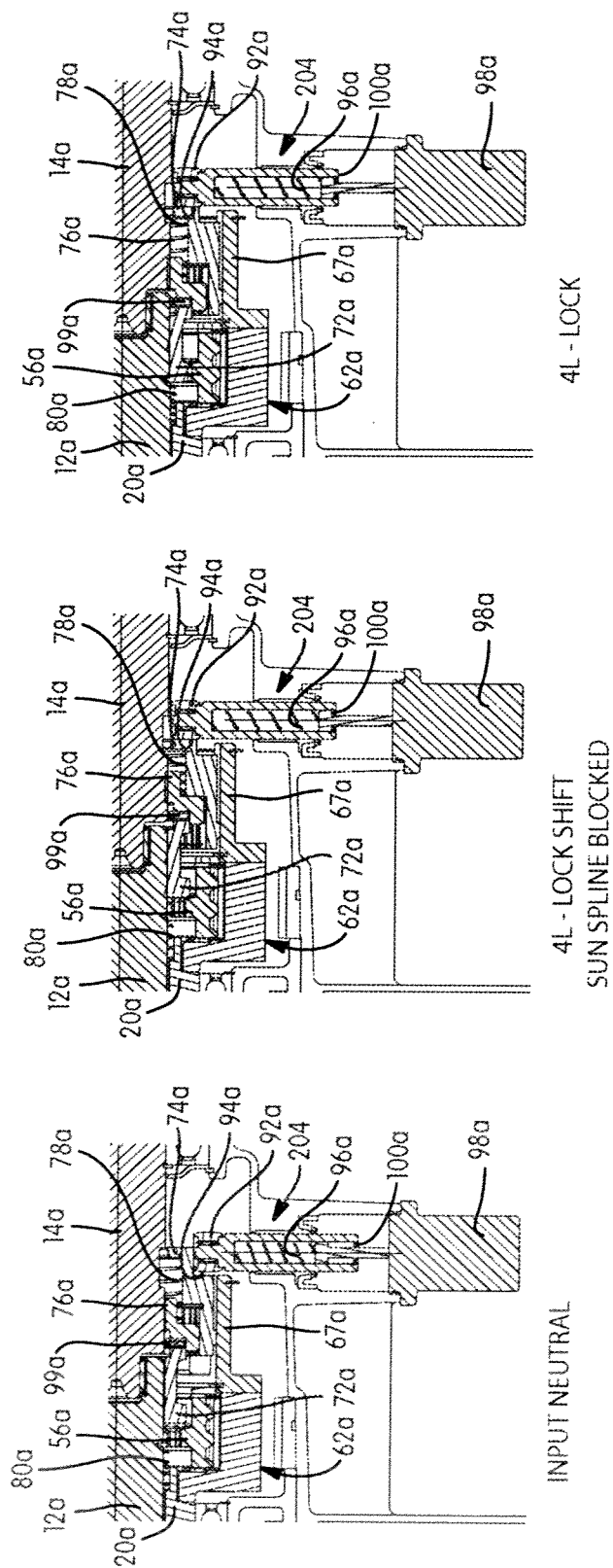

HIGH EFFICIENCY TRANSFER CASE

CROSS-REFERENCE TO RELATED APPLICATIONS

This application is a continuation of International Application No. PCT/US2011/052562 having an international filing date of Sep. 21, 2011, which claims the benefit of U.S. Provisional Application No. 61/386,805 filed Sep. 27, 2010. The entire disclosures of the above-noted applications are herein incorporated by reference in their entirety.

BACKGROUND

Vehicles have been equipped with power transfer devices such as transfer cases for many years. Typically, transfer cases allow operation of the vehicle in a two-wheel drive mode or a four-wheel drive mode. Some transfer cases also provide multi-speed functionality.

Over the years, original equipment manufacturers have struggled to provide low cost and energy efficient transfer cases. For example, most transfer cases include wet clutches which exhibit oil churning losses as well as lubrication pump losses. In addition, some actuation systems require a relatively high electrical current draw to activate range and mode shifting systems.

Some of the two-speed transfer cases are relatively complex requiring a large number of relatively expensive components to provide the desired functions. In the past, dedicated single-speed or multi-speed transfer cases either shared few components or a single-speed version occupied the same packaging volume as the multi-speed version. Accordingly, it may be desirable to provide an optimized transfer case having a modular design to meet single-speed or multi-speed applications while maximizing the efficiency of the transfer case by minimizing the energy losses during operation.

SUMMARY

This section provides a general summary of the disclosure, and is not a comprehensive disclosure of its full scope or all of its features.

A multi-speed power transmission device includes an input shaft, first and second output shafts and a planetary gearset. The planetary gearset includes a sun gear, a non-rotary annulus gear, pinion gears meshed with the sun gear and the annulus gear, and a carrier rotatably supporting the pinion gears. An axially moveable sleeve fixes the first output shaft and the input shaft for rotation when in a first position and the sleeve fixes the sun gear and the input shaft for rotation when in a second position. A hub is axially moveable and free to rotate relative to the first output shaft when in a first position. The hub is fixed for rotation with the first output shaft when in a second position. An axially moveable cam plate is continuously fixed for rotation with the carrier and urges the hub toward its second position when moved from a first axial position into a second axial position. The input shaft drives the first output shaft at a reduced speed via the planetary gearset when the sleeve, hub and the cam plate are at their second positions.

A multi-speed power transmission device for a vehicle includes an input shaft, first and second output shafts and a planetary gearset. The planetary gearset includes a sun gear, a non-rotary annulus gear, pinion gears meshed with the sun gear and the annulus gear, and a carrier rotatably supporting the pinion gears. A sleeve is moveable to drivingly couple and decouple the sun gear with the input shaft. A cam plate is axially moveable between first and second positions. The cam plate is continuously fixed for rotation with the carrier and includes a helical cam surface that reacts an axial load such that rotation of the cam plate causes axial translation of the cam plate to control the sleeve position. The input shaft drives the first output shaft at a reduced speed via the planetary gearset when the cam plate is at its second position and the sleeve drivingly couples the sun gear to the input shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5A-5F are fragmentary sectional views depicting components of a range shift mechanism in positions corresponding to various operating modes;

FIGS. 8A-8G are fragmentary sectional views depicting components of a range shift mechanism in positions corresponding to various operating modes;

Corresponding reference numerals indicate corresponding parts throughout the several views of the drawings.

DETAILED DESCRIPTION

Figure 1:
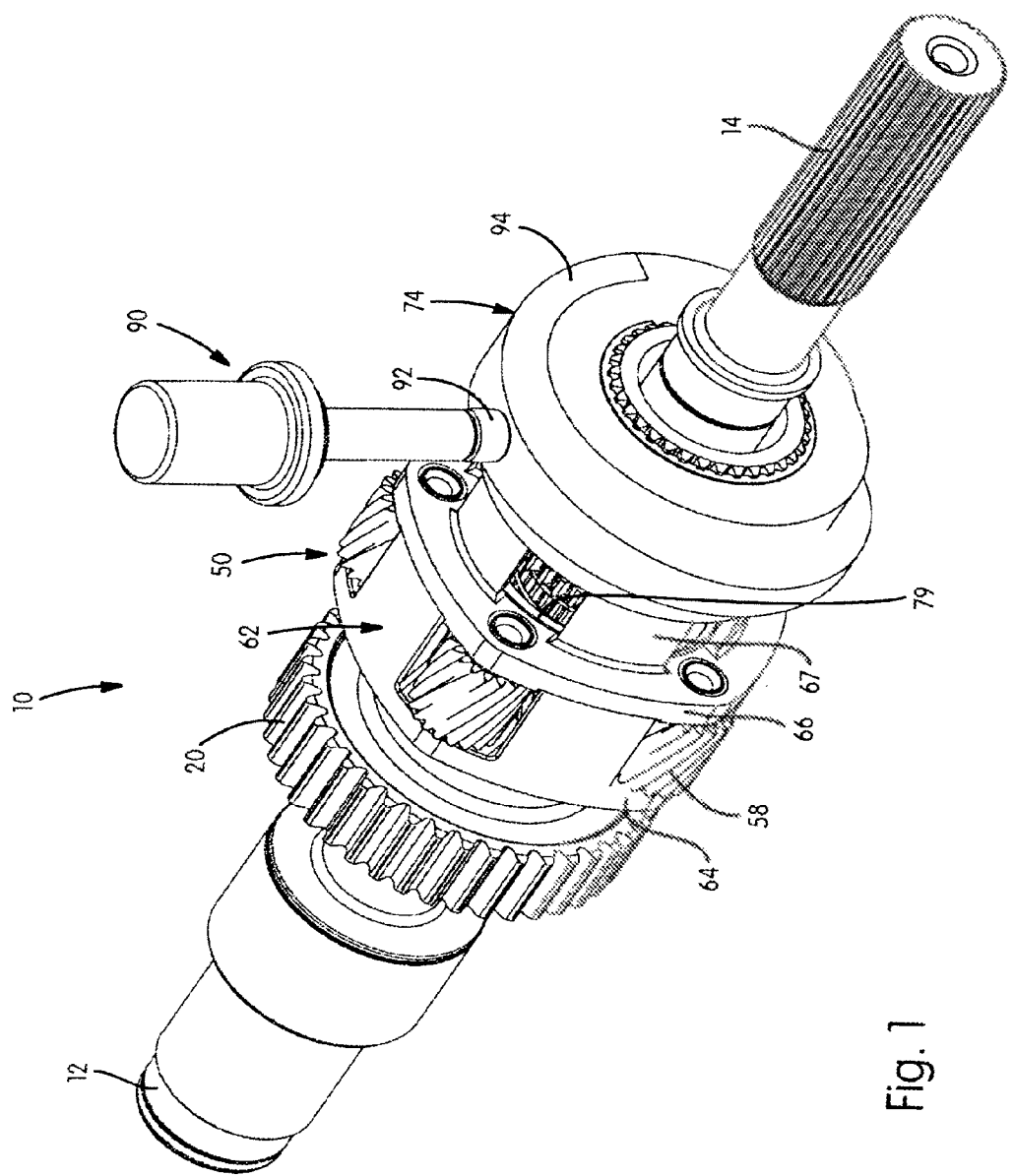
FIG. 1 is a fragmentary perspective view of a portion of a high efficiency transfer case constructed in accordance with the teachings of the present disclosure.

Example embodiments will now be described more fully with reference to the accompanying drawings.

FIGS. 1-5F depict a two-speed transfer case 10 having an input shaft 12, a first output shaft 14 and a second output shaft 16. A dry multi-plate clutch 18 selectively interconnects input shaft 12 with a drive sprocket 20 of a power transfer mechanism 22. Drive sprocket 20 is shown to be rotatably mounted on input shaft 12. Power transfer mechanism 22 also includes a driven sprocket 24 fixed for rotation with second output shaft 16. A flexible drive member or chain 26 drivingly interconnects drive sprocket 20 with driven sprocket 24. Directly intermeshed gears may alternatively be used.

Clutch 18 includes a drum 30 fixed for rotation with drive sprocket 20. A plurality of outer clutch plates 32 are fixed for rotation with and are axially moveable relative to drum 30. A hub 34 is integrally formed with input shaft 12. A plurality of inner clutch plates 36 are fixed for rotation with and are axially moveable relative to hub 34. An apply plate 38 is in splined engagement with input shaft 12 and is axially moveable to compress inner clutch plates 36 into engagement with outer clutch plates 32 and transfer torque across clutch 18. A coil 40 is selectively energizable to produce a magnetic field to attract an armature 42. Armature 42 is fixed with apply plate 38 such that energizing coil 40 controls the magnitude of torque transferred across clutch 18. Bearings 28 and 31 rotatably support drum 30 and drive sprocket 20 within a housing assembly 33.

A planetary gearset 50 is operable to transfer torque from input shaft 12 to first output shaft 14 and drive sprocket 20 at a direct drive ratio of 1:1 or a reduced drive ratio providing a torque multiplication. Planetary gearset 50 includes an annulus 52 fixed to a rear housing 54, a sun gear 56 and a plurality of pinion gears 58 in constant mesh with annulus 52 and sun gear 56. Each of pinion gears 58 are supported for rotation on a pinion pin 60 that forms a portion of a carrier 62. Carrier 62 also includes a front carrier plate 64 fixed for rotation with drive sprocket 20 and a rear carrier plate 66. Rear carrier plate 66 includes a plurality of circumferentially spaced apart and axially extending lugs 67.

A range shift mechanism 70 is operable to place transfer case 10 in one of a reduced output shaft speed or low mode, a neutral mode or a high mode of operation. Range shift mechanism 70 includes a sleeve 72 movable to selectively drivingly interconnect input shaft 12 and first output shaft 14. As shown, sleeve 72 has internal splines engaging external splines on input shaft 12 and external splines on first output shaft 14 to facilitate sliding movement of sleeve 72. A two-wheel drive high mode of operation may be provided by placing clutch 18 in an open, non-torque transferring mode and positioning sleeve 72 as shown in FIG. 5A and identified as "HIGH." All planetary gearset components are stationary at this time and torque is transferred from input shaft 12 to first output shaft 14 through sleeve 72.

Figure 2:
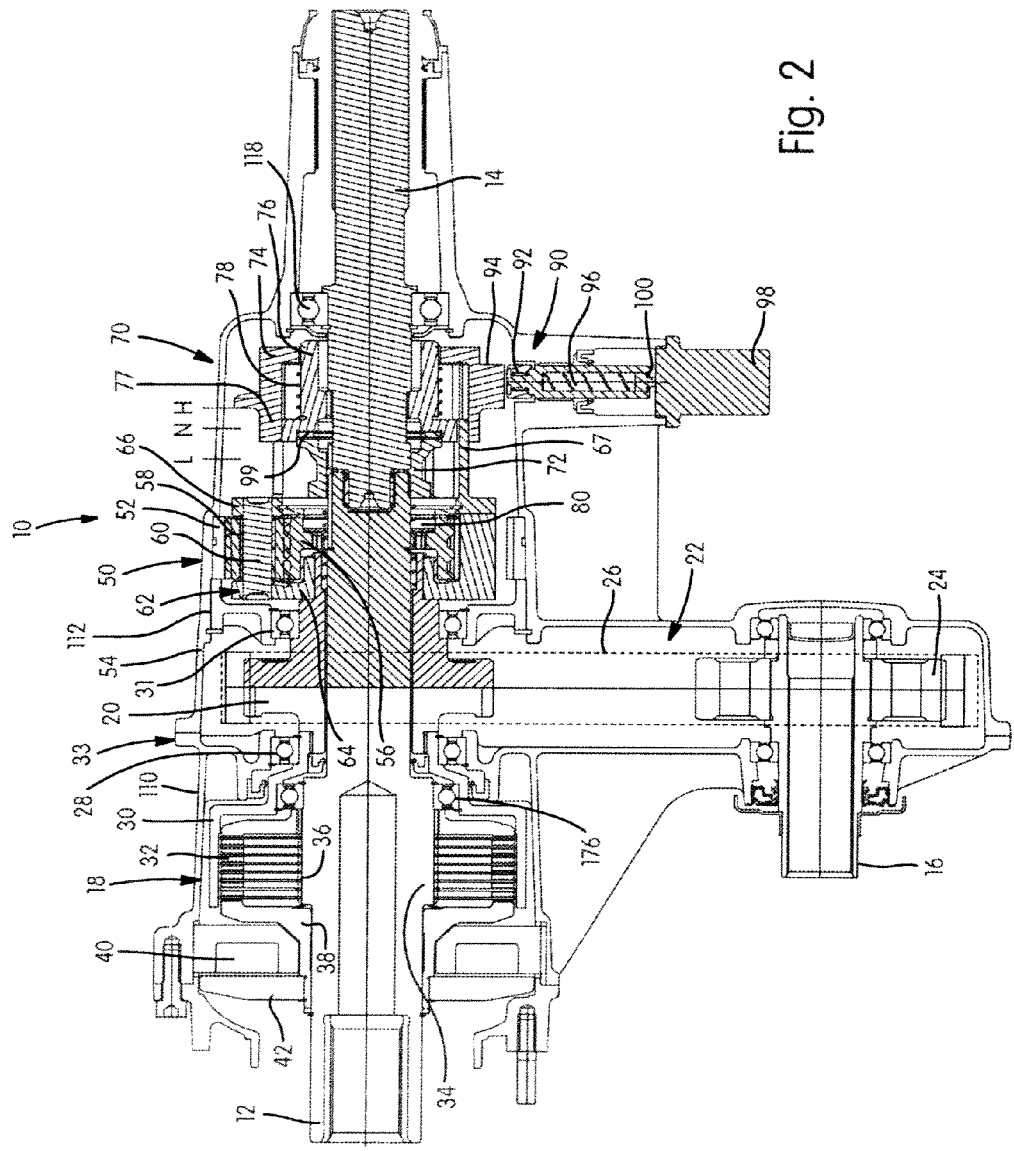
FIG. 2 is a cross-sectional side view taken through the transfer case.
Figure 3:
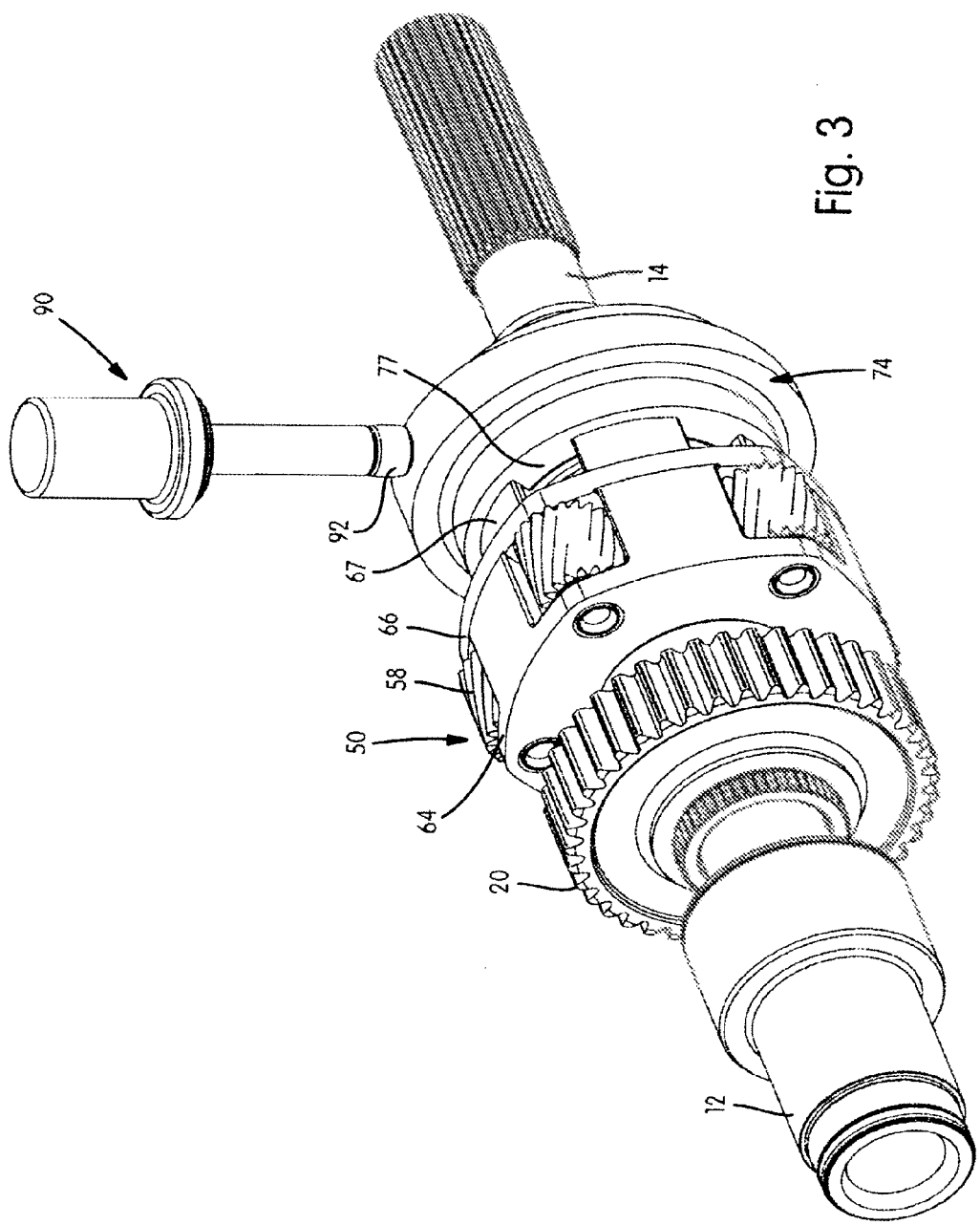
FIG. 3 is a fragmentary perspective view of a portion of the transfer case depicted in the previous Figures.
Figure 4:
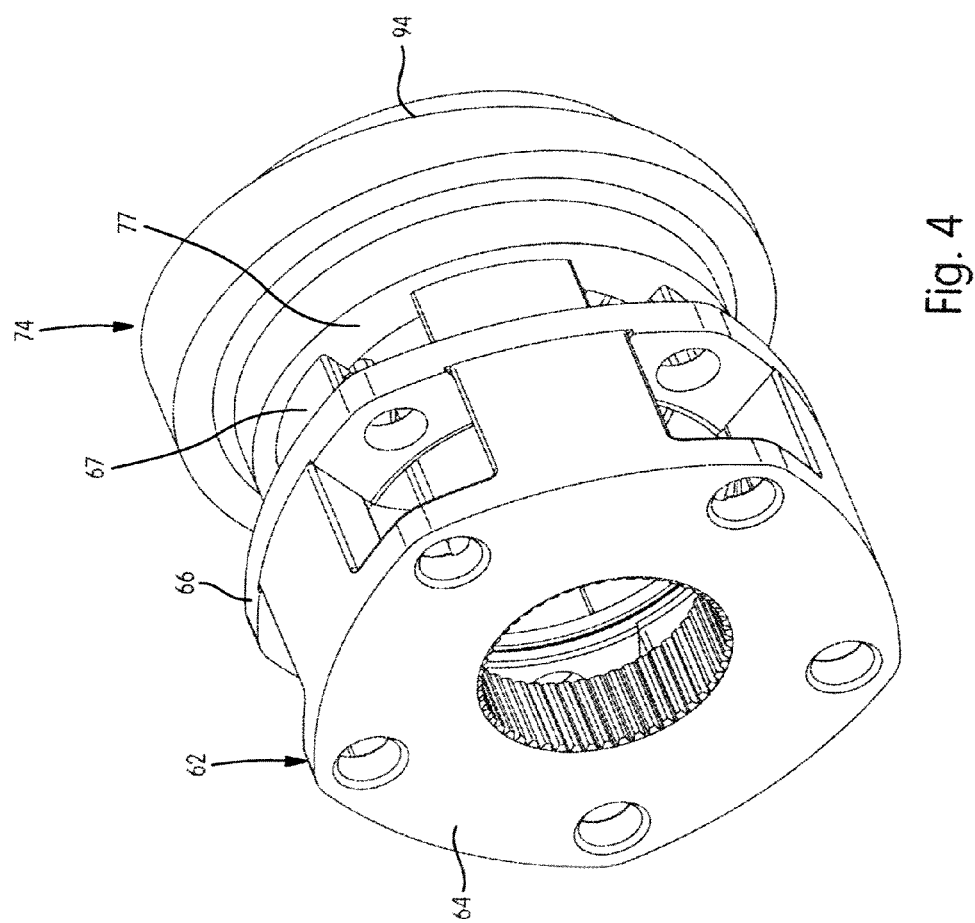
FIG. 4 is fragmentary perspective view of a carrier and a rotary cam.

Range shift mechanism 70 also includes a rotary cam 74 splined on a hub 76 which is configured to surround a portion of first output shaft 14. Rotary cam 74 includes a plurality of radially inwardly extending lugs 77 drivingly engaged with carrier lugs 67. Engagement of lugs 77 on rotary cam 74 with carrier lugs 67 on rear carrier plate 66 permits sliding movement of rotary cam 74 relative to planetary gearset 50 while interconnecting rotary cam 74 and hub 76 for common rotation with carrier 62. A cam spring 78 urges cam 74 to the right as shown in FIG. 2. A retaining ring 79 restricts lugs 77 from disengaging lugs 67. A return spring 80 acts between drive sprocket 20 and sleeve 72 and normally urges sleeve 72 toward the right as shown in FIG. 2.

A range actuator 90 includes a cam follower 92 selectively engageable with a cam surface 94 of rotary cam 74. A solenoid 98 drives a pin 100 to translate cam follower 92. A spring 96 allows relative axial movement between pin 100 and cam follower 92. Rotation of cam 74 causes axial translation of cam 74 and provides range shift control, as will be described.

Based on the relative position of the components previously described, it should be appreciated that sun gear 56 may be selectively connected and disconnected with input shaft 12. Carrier 62 may be selectively coupled and decoupled for rotation with first output shaft 14. When sun gear 56 is disconnected from input shaft 12, a direct speed ratio of 1:1 is produced between the input shaft and output shafts. When sun gear 56 is drivingly connected to input shaft 12 and carrier 62 is drivingly coupled with first output shaft 14, a reduced speed ratio of approximately 2.7:1 is achieved between the input and output shafts. Other ratios are also contemplated.

When transfer case 10 is operating in the two-wheel drive high mode of operation depicted in FIG. 5A, it should be appreciated that an active all-wheel drive mode is also available. During this mode, clutch 18 is modulated to send torque to second output shaft 16 via drive sprocket 20 and power transfer mechanism 22. When clutch 18 is activated, planetary gearset 50 rotates but does not transmit torque.

To achieve a high range mode of operation, coil 40 is activated to cause torque to be transferred from input shaft 12 through clutch 18, drum 30, drive sprocket 20 and provide input to carrier 62. In this manner, the energy for the range shift is provided by the vehicle driveline and not a separate actuator. Coil 40 is activated during the range shift so that the components of range shift mechanism 70 rotate as the vehicle is driven in a forward direction. Clutch 18 is deactivated once the shift is complete. Solenoid 98 is actuated but only a low current is required to axially translate cam 74 to the "H" position shown in FIG. 2. With rotary cam 74 located at the "H" position, sleeve 72 is located in a first position and couples input shaft 12 and first output shaft 14. In addition, hub 76 is shown in a first position whereat hub 76 is decoupled from first output shaft 14.

FIGS. 5B and 5C labeled "SHIFTING" and "NEUTRAL", respectively, depict a shift from the high range to a neutral mode of operation. When neutral is selected, coil 40 is activated to engage clutch 18 and range shift mechanism 70 activates solenoid 98 to extend pin 100 and cause cam follower 92 to engage rotary cam 74. Depending on the rotational position of cam 74, follower 92 may be restricted from accessing cam surface 94. If so, spring 96 compresses as shown in FIG. 5B. As the vehicle moves, rotation of carrier 62 causes rotary cam 74 to rotate allowing follower 92 to engage cam surface 94. The energy supplied from the vehicle driveline continues to drive rotary cam 74 thereby causing cam 74 to move axially to the neutral "N" position and translate hub 76 and sleeve 72 to intermediate positions to disengage sleeve 72 from first output shaft 14. An axial thrust bearing 99 is positioned between hub 76 and sleeve 72. Coil 40 is then deactivated for producing the neutral mode. During the neutral mode of operation, the internal combustion engine may continue to run without causing vehicle motion. Alternatively, the vehicle may be towed without back-driving the transmission.

A locked four-wheel drive low range mode may be obtained by activating coil 40 to engage clutch 18 and activating solenoid 98 and causing the shift system components to move to the positions identified in FIGS. 5D, 5E and 5F entitled "CARRIER SPLINE BLOCKED", "SUN SPLINE BLOCKED", and "LOW." To shift to the low range mode, coil 40 is activated during the shift so that the components rotate as the vehicle is driven in the forward direction. Clutch 18 is opened once the shift is complete. Rotation of rotary cam 74 caused by rotation of carrier 62 causes simultaneous axial translation of cam 74 to the "L" position (FIG. 2) when cam follower 92 engages cam surface 94 as depicted in FIGS. 5D, 5E and 5F. It should be appreciated that the full axial extent of translation into its second position cam 74 occurs regardless of whether a carrier spline blocking condition or a sun spline blocking condition exists. If a carrier spline engagement is blocked, as depicted in FIG. 5D, spring 78 compresses to load hub 76 toward the left as viewed in the Figure. Once the blocking condition has cleared, hub 76 moves into its second position whereat the internal splines formed on hub 76 drivingly engages the external splines formed on first output shaft 14.

FIG. 5E depicts a condition where the splined engagement between sun gear 56 and sleeve 72 is blocked. At this time, spring 80 is compressed. Once the blocking condition clears, sleeve 72 moves into its second position such that sun gear 56 and sleeve 72 are fixed for rotation with one another as well as hub 76 and first output shaft 14.

Figure 6:
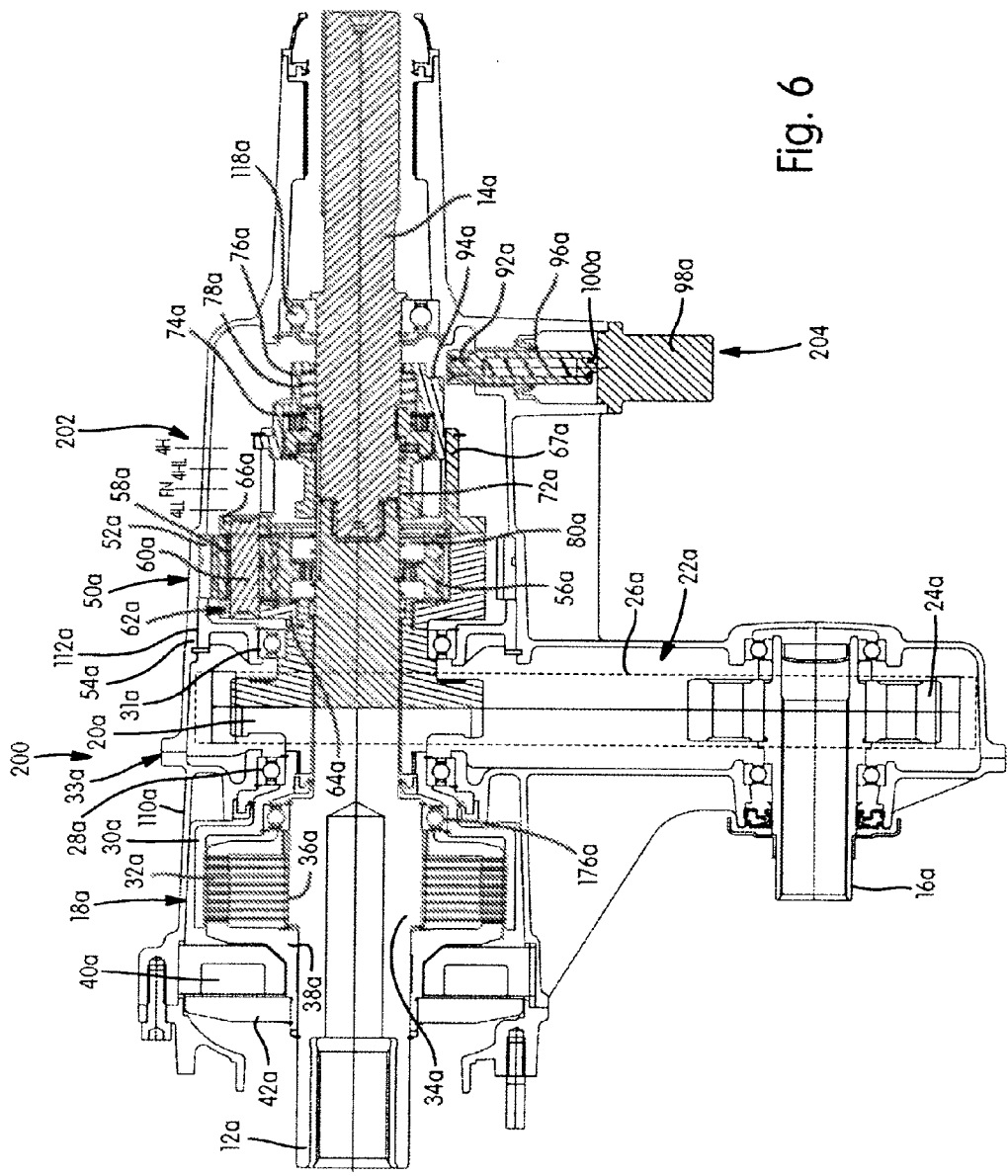
FIG. 6 is a cross-sectional view taken through an alternate transfer case.
Figure 7:
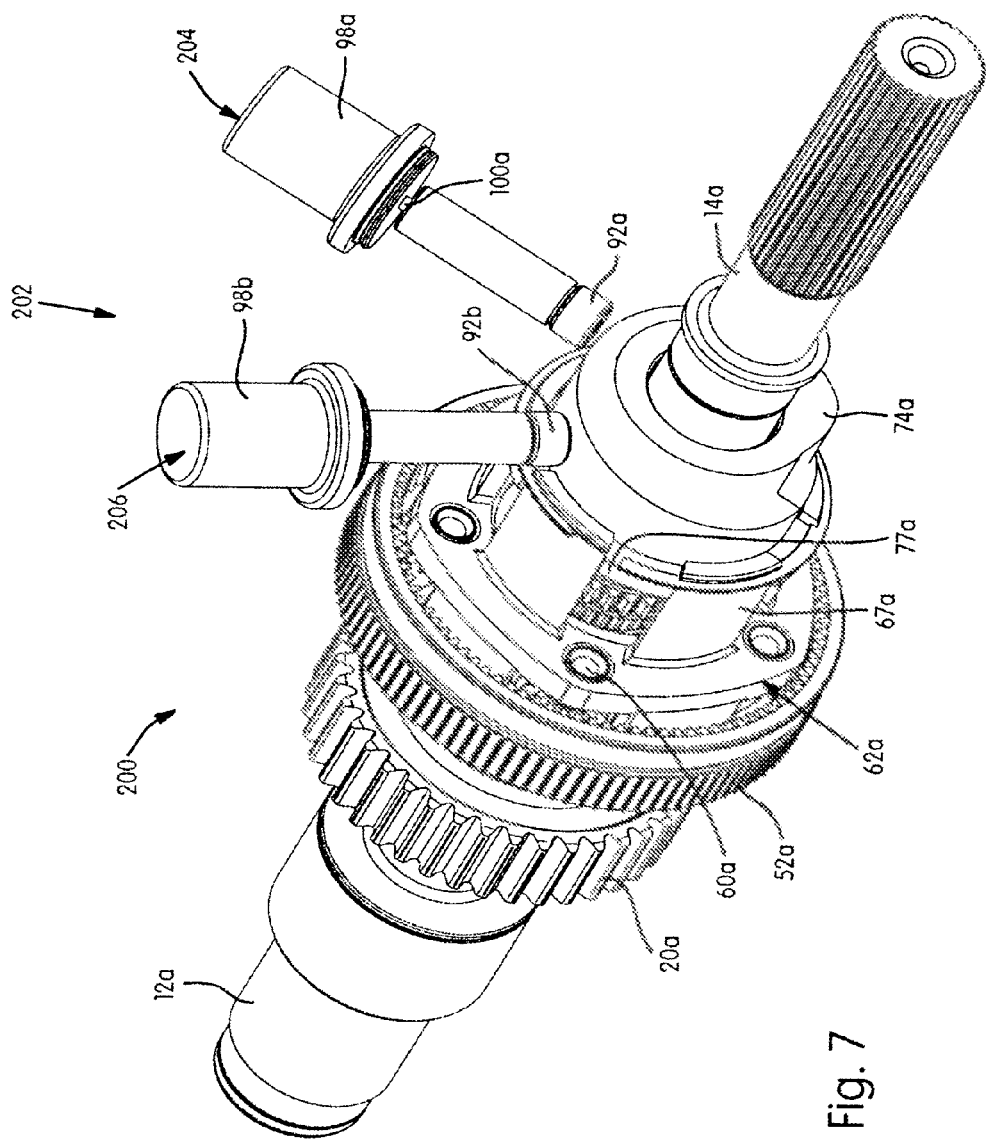
FIG. 7 is a fragmentary perspective view of a portion of the transfer case shown in FIG. 6.

An alternate transfer case 200 is depicted at FIGS. 6-8. Transfer case 200 is substantially similar to transfer case 10. As such, similar elements will be identified with like numerals include a lower "a" suffix. Transfer case 200 provides additional modes of operation over and above those previously described in relation to transfer case 10. In particular, transfer case 200 is operable to provide a locked four-wheel drive low range mode of operation, a neutral mode, a locked four-wheel drive high range mode, and a high range mode of operation that may operate as a two-wheel drive mode or an adaptively controlled four-wheel drive high mode.

Transfer case 200 includes a range shift mechanism 202 where the energy for shifting is supplied by the kinetic energy of the vehicle as previously described in relation to transfer case 10. Shift mechanism 202 includes a first linear actuator assembly 204 and second linear actuator assembly 206. Each of the linear actuators is configured substantially similarly to range actuator 90. As such, the elements will be identified as before with "a" suffix elements relating to linear actuator assembly 204 and "b" suffix elements relating to linear actuator assembly 206.

First linear actuator assembly 204 is axially positioned at substantially the same location as range actuator 90 previously described. Second linear actuator assembly 206 is axially positioned closer to drive sprocket 20a than first linear actuator assembly 204. By configuring the actuators in this matter, the magnitude of axial translation experienced by cam 74a is doubled. The additional linear travel allows for additional modes of transfer case operation. Specifically, FIG. 6 indicates the position of rotary cam 74a to define the high-range mode *"4H"), the locked four-wheel drive high range mode ("4HL"), the neutral mode ("N"), and the locked four-wheel low range mode ("4LL").

With reference to FIGS. 8A-8G, the various operating modes of transfer case 200 are depicted. At FIG. 8A, the high-range mode of operation includes drivingly interconnecting input shaft 12a with first output shaft 14a via sleeve 72a while hub 76a is decoupled from first output shaft 14a. FIGS. 8B and 8C show a shift from the high range mode to the locked four-wheel drive high range mode of operation at FIG. 8D. The shift is initiated as previously described where actuation of clutch 18a via energization of coil 40 and activation of solenoid 98a causes engagement of cam follower 92a with cam face 94a which causes axial translation of rotary cam 74a to the position depicted in FIG. 8C. If the splined interconnection between first output shaft 14a and hub 76a is blocked, spring 78a compresses. Once the blocking condition clears, hub 76a translates towards the left side of the Figure to fix first output shaft 14a for rotation with hub 76a. At this time, input shaft 12a and first output shaft 14a remain fixed for rotation with one another via sleeve 72a. Carrier lugs 67a engage rotary cam lugs 77a to provide a torque transferring interconnection. Hub 76a is in splined engagement with rotary cam 74a to fix drive sprocket 20a for rotation with first output shaft 14a.

A neutral mode of operation may be obtained by energizing second solenoid 98b and causing rotary cam 74a to rotate and translate to the position depicted in FIG. 8E. At this time, sleeve 72a disengages first output shaft 14a to interrupt the torque path.

FIGS. 8F and 8G relate to shifting from the neutral position to the locked four-wheel drive low range mode. Second solenoid 98b is energized to engage rotary cam face 94a and cause rotary cam 74a to translate further to the left as depicted in FIG. 8F. If the splined interconnection between sun gear 56a and sleeve 72a is momentarily blocked, spring 78a compresses. Once the blocking condition is cleared, a splined interconnection exists between sleeve 72a and sun gear 56a. Spring 80a is fully compressed at this time. Torque provided to input shaft 12a is multiplied via planetary gearset 50a and transferred to first output shaft 14a, via rear carrier plate 66a, rotary cam 74a, and hub 76a. As previously mentioned, carrier 62a is fixed for rotation with drive sprocket 20a to transfer the output of planetary gearset 50a to second output shaft 16a. Torque flows from input shaft 12a through sun gear 56a, planetary pinions 58a, carrier 62a, hub 76a and is provided to first output shaft 14a and second output shaft 16a.

Housing assembly 33 is a transmission adapted to mount to a variety of transmissions. A front housing 110 supports coil 40 and second output shaft 16. A bearing support plate 112 captures the chain loads and the annulus thrust loads. Rear housing 54 supports first output shaft 14. A lubrication system contains a passive lubrication system that pulls oil from a sump via the chain 26 when rotating to lubricate the appropriate bearings and seals. The entire input cavity containing clutch 18 is dry and contains a seal and a bearing 116. A rear output bearing 118, bushing and seal are lubricated via an elevated sump created by an oil dam at the rear output bearing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case for a vehicle, comprising:
an input shaft;
a first output shaft;
a planetary gearset including a sun gear, a non-rotary ring gear, pinion gears meshed with the sun and ring gears, and a carrier rotatably supporting the pinion gears;
a sleeve axially moveable between first and second positions, the sleeve coupling the first output shaft for rotation with the input shaft when in its first position, the sleeve coupling the sun gear for rotation with the input shaft when in its second position;
a hub axially moveable between first and second positions, the hub being free to rotate relative to the first output shaft when in its first position, and the hub being coupled for rotation with the first output shaft when in its second position; and
a cam plate axially moveable between first and second positions, the cam plate being continuously coupled for rotation with the carrier and urging the hub toward its second position when in its second position, wherein the input shaft drives the first output shaft at a reduced speed when the sleeve, the hub and the cam plate are each located in their second position.

2. The transfer case of claim 1, further including an actuator for selectively urging the cam plate toward its second position.

3. The transfer case of claim 2, wherein the cam plate includes a helical cam surface engaged by the actuator such that rotation of the cam plate causes concurrent axial movement of the cam plate.

4. The transfer case of claim 3, further including a spring urging the hub toward its second position when the cam plate is in its second position, wherein the sleeve and hub need not be in its second position to allow the cam plate into its second position.

5. The transfer case of claim 4, wherein the actuator includes a solenoid for translating a cam follower into and out of engagement with the cam plate.

6. The transfer case claim 5, further including another actuator axially offset from the actuator to cause additional axial translation of the cam plate to a third position that is further from the first cam plate position than the second cam plate position.

7. The transfer case claim 1, wherein kinetic energy from the vehicle when moving drives the cam plate axially.

8. The transfer case of claim 1, further including a transfer mechanism continuously drivingly interconnecting the carrier and a second output shaft.

9. The transfer case claim 1, wherein the carrier includes a plurality of circumferentially spaced apart lugs drivingly engaged with the cam plate.

10. The transfer case of claim 9, wherein the lugs surround the sleeve.

11. The transfer case of claim 1, further including a plate clutch drivingly interconnecting the input shaft and a second output shaft.

12. The transfer case of claim 11, further including a coil for generating a magnetic field and applying a clutch engagement force to the plate clutch.

13. The transfer case of claim 1 further comprising:
a second output shaft;
a power transfer mechanism having a first transfer member rotatable relative to the input shaft and drivingly coupled to the carrier of the planetary gearset, and a second transfer member fixed for rotation with the second output shaft and being drivingly coupled to the first transfer member;
a clutch having a first clutch member fixed for rotation with the first transfer member, a second clutch member driven by the input shaft, a clutch pack operably disposed between the first and second clutch members, and a power-operated clutch actuator for selectively applying a clutch engagement force to the clutch pack and transferring torque from the input shaft to the second output shaft through the power transfer mechanism;
a first biasing member disposed between first transfer member and the sleeve for normally biasing the sleeve and the hub toward their first positions;
a second biasing member disposed between the hub and the cam plate for normally biasing the cam plate toward its first position; and
a range actuator for selectively engaging a cam surface formed on the cam plate and operable for causing axial translation of the cam plate between its first and second position in response to rotation of the carrier;
wherein a high-range mode is established when each of the sleeve, the hub and the cam plate are located in their first position, and wherein a locked four-wheel low-range drive mode is established when each of the sleeve, the hub and the cam plate in located in their second position.

14. The transfer case of claim 13 wherein the clutch actuator is released to disengage the clutch pack when the locked four-wheel drive low range drive mode is established, wherein drive torque is transferred from the input shaft to the first output shaft through the sun gear, the pinion gears, the carrier, the cam plate and the hub, and wherein drive torque is transferred from the input shaft to the second output shaft through the sun gear, the pinion gears, the carrier and the power transfer mechanism.

15. The transfer case of claim 13 wherein a two-wheel high range mode is established when each of the sleeve, the hub, and the cam plate are located in their first position and the clutch actuator is released to disengage the clutch pack, and wherein a four-wheel high-range mode is established when each of the sleeve, the hub, and the cam plate are located in their first position and the clutch actuator is activated to engage the clutch pack and transfer torque to the second output shaft.

16. The transfer case of claim 13 wherein the sleeve is adapted to be located in an intermediate position between its first and second positions such that the sleeve is disconnected from both the first output shaft and the sun gear, wherein the hub is adapted to be located in an intermediate position between its first and second position such that the hub is free to rotate relative to the first output shaft, wherein the cam plate is adapted to be located in an intermediate position between its first and second positions such that the cam plate couples the hub to the carrier for common rotation, and wherein a neutral mode is established when each of the sleeve, the hub and the cam plate is in its intermediate position such that the first output shaft is free to rotate relative to the input shaft.

17. A transfer case for a vehicle,
comprising:
an input shaft;
a first output shaft;
a planetary gearset including a sun gear, a ring gear, a pinion gear meshed with the sun and ring gears, and a carrier rotatably supporting the pinion gear;
a sleeve moveable to drivingly couple and decouple the sun gear with the input shaft; and
a cam plate axially moveable between first and second positions, the cam plate being continuously coupled for rotation with the carrier and including a cam surface that reacts an axial load such that rotation of the cam plate causes axial translation of the cam plate to control the sleeve position, wherein the input shaft drives the first output shaft at a reduced speed via the planetary gearset when the cam plate is in its second position and the sleeve drivingly couples the sun gear for rotation with the input shaft.

18. The transfer case of claim 17, further including an actuator having a solenoid for translating a cam follower into and out of engagement with the cam surface.

19. The transfer case of claim 18, further including another actuator axially offset from the actuator to cause additional axial translation of the cam plate to a third position that is further from the first cam plate position than the second cam plate position.

20. The transfer case of claim 17, wherein kinetic energy from the vehicle drives the cam plate axially when the vehicle is moving.

21. The transfer case of claim 17, further including a transfer mechanism continuously drivingly interconnecting the carrier and a second output shaft.

22. The transfer case of claim 17, wherein the carrier includes a plurality of circumferentially spaced apart lugs drivingly engaged with the cam plate.

23. The transfer case of claim 22 wherein the lugs surround the sleeve.

24. The transfer case of claim 17 wherein the carrier is fixed for rotation with a second output shaft via a transfer mechanism, and wherein a friction clutch is disposed between the transfer mechanism and the input shaft and can be selectively engaged to transfer drive torque to both the second output shaft and the carrier.

25. A transfer case for a motor vehicle,
comprising:
an input shaft;

a first output shaft and a second output shaft;
a power transfer mechanism couple for rotation with the second output shaft;
a clutch assembly operable to selectively couple the power transfer mechanism to the input shaft and including a friction clutch and a power-operated clutch actuator, the friction clutch including a first clutch member driven by the input shaft, and a second clutch member coupled for rotation with the power transfer mechanism, and a clutch pack operably disposed between the first and second clutch members, the clutch actuator being operable to shift the friction clutch between a non-actuated mode and an actuated mode, wherein the non-actuated mode is established when the clutch pack is released and the actuated mode is established when the clutch pack is engaged;
a planetary gearset including a sun gear, a non-rotary ring gear, pinion gears meshed with the sun gear and the ring gear, and a carrier rotatably supporting the pinion gears, the carrier being coupled for rotation with the power transfer mechanism; and
a range shift mechanism including a sleeve fixed for rotation with an axial sliding movement on the input shaft between a first sleeve position and a second sleeve position, a hub surrounding the first output shaft for axial sliding movement between a first hub position and a second hub position, a rotary cam fixed for rotation with and axial sliding movement relative to the carrier of the planetary gearset between a first cam position and a second cam position, a first biasing device for normally biasing the sleeve towards its first sleeve position and the hub toward its first hub position, a second biasing device for normally biasing the rotary cam towards its first cam position, and a range actuator for converting rotary motion of the rotary cam into axial movement of the rotary cam between its first and second cam positions, the sleeve being operable in its first sleeve position to couple the first output shaft for rotation with the input shaft and being operable in its second sleeve position to couple the sun gear for rotation with the input shaft, the hub being operable in its first hub position to rotate relative to the first output shaft and being operable in its second hub position to be coupled for rotation with the first output shaft, the rotary cam being operable in its first cam position to locate the sleeve in its first sleeve position and the hub in its first hub position and being operable cam position to urge the hub into its second hub position and the sleeve into its second sleeve position;
wherein a direct speed ratio drive connection is established between the input shaft and the first output shaft when the sleeve is in its first sleeve position, the hub is in its first hub position and the rotary cam is in its first cam position, and wherein a reduced speed ratio drive connection is established between the input shaft and the first output shaft when the sleeve is in its second sleeve position, the hub is in its second hub position and the rotary cam is in its second cam position.

26. The transfer case of claim 25 wherein a two-wheel drive high-range operating mode is established when the friction clutch is operating in its non-actuated mode and the direct speed ratio drive connection is established between the input shaft and the first output shaft, wherein a four-wheel drive high-range operating mode is established when the friction clutch is operating in its actuated mode and the direct speed ratio drive connection is established between the input shaft and the first output shaft, and wherein a locked four-wheel drive low-range operating mode is established when the friction clutch is operating in its non-actuated mode and the reduced speed ratio drive connection is established between the input shaft and the first output shaft.

27. The transfer case of claim 26 wherein the sleeve is operable in a third sleeve position located between the first and second sleeve positions to uncouple both the sun gear and the first output shaft from the input shaft, wherein the hub is operable in a third hub position located between the first and second hub positions to continue to permit rotation of the hub relative to the first output shaft, wherein the rotary cam is operable in a third cam position located between the first and second cam positions to urge the sleeve into its third sleeve position and the hub into its third hub position, and wherein a neutral operating mode is established when the friction clutch is operating in its non-actuated mode and the hub, the sleeve and the rotary cam are each axially located in their corresponding third position.

28. The transfer case of claim 26 wherein the friction clutch is shifted into its actuated position to rotate the carrier and the rotary cam and allow the range actuator to engage the rotary cam and cause axial movement of the rotary cam between its three distinct cam positions for shifting between the operating modes.

29. The transfer case of claim 26 wherein the sleeve is operable in a third sleeve position located between its first and second sleeve positions to maintain coupled engagement with the first output shaft, wherein the hub is operable in a third hub position located between its first and second hub positions to be coupled for rotation with the first output shaft such that the carrier is coupled via the rotary cam and the hub for rotation with the first output shaft, wherein the rotary cam is operable in a third cam position located between its first and second cam positions to locate the hub in its third position and the sleeve in its third position, wherein a locked direct speed ratio is established between the input shaft and the first and second output shafts when the sleeve is in its third sleeve position, the hub is in its third hub position and the rotary cam is in its third cam position, and wherein a locked four-wheel high-range drive mode is established when said friction clutch is operating in its non-actuated mode and the locked direct speed ratio drive connection is established.

* * * * *

UNITED STATES PATENT AND TRADEMARK OFFICE
CERTIFICATE OF CORRECTION

PATENT NO. : 8,821,334 B2  Page 1 of 1
APPLICATION NO. : 13/850584
DATED : September 2, 2014
INVENTOR(S) : Joseph G. Mueller, Douglas O. Bradley and Bradley R. Larkin It is certified that error appears in the above-identified patent and that said Letters Patent is hereby corrected as shown below:

In the Claims

Column 9, Line 47, Claim 25: "operable cam" should read: "operable in its second cam".

Signed and Sealed this
Seventeenth Day of March, 2015

Michelle K. Lee
*Director of the United States Patent and Trademark Office*